July 18, 1967  P. H. MERDINYAN  3,331,391

CHECK VALVE CLAPPER CONSTRUCTION

Filed June 1, 1964

INVENTOR
PHILIP H. MERDINYAN
BY
*Herman Foster*
ATTORNEY

United States Patent Office 3,331,391
Patented July 18, 1967

3,331,391
CHECK VALVE CLAPPER CONSTRUCTION
Philip H. Merdinyan, East Greenwich, R.I., assignor to Grinnell Corporation, Providence, R.I., a corporation of Delaware
Filed June 1, 1964, Ser. No. 371,281
6 Claims. (Cl. 137—527)

This invention relates to an improvement in check valves and more particularly to an improvement in the type of check valve often referred to as an alarm valve which is used in fire protection sprinkler systems.

In fire protection sprinkler systems alarm check valves have been used to some extent since the beginning of automatic sprinkler installations. These valves are generally located at or near the base of sprinkler risers although they may also be used as floor or branch alarms. The basic design of most water-flow alarm valves is that of a check valve having a clapper which lifts from its seat when water flows into the sprinkler system. Several approaches are applicable for then transmitting an alarm to indicate that water is flowing through the system, however, these are not pertinent to the present invention and therefore are not shown or described here.

The present invention concerns itself in particular to a clapper construction of alarm check valves. Periodically these clappers are inspected to determine their serviceability. It is often found that the sealing member of the clapper must be replaced. Heretofore, such a replacement procedure was difficult and time consuming because the clapper was generally held together by a bolt or some other form of threaded fastener. If the clapper had been in undisturbed service for any great length of time these bolts or fasteners usually were corroded and/or coated with scale and therefore very difficult to loosen. The need for such fasteners has, to date, been presumed because of the belief that the flowing water would remove any unfastened seal member.

With the novel clapper construction of the present invention an effective sealing member is held in place on the clapper without any retaining means whatsoever. Moreover, the replacement of the seal member, which in a preferred embodiment, takes the form of a diaphragm, is greatly simplified and speeded up since no fastening device is required to hold the seal member in place.

In the accompanying drawing which illustrates a preferred embodiment of the invention:

Figure 1:
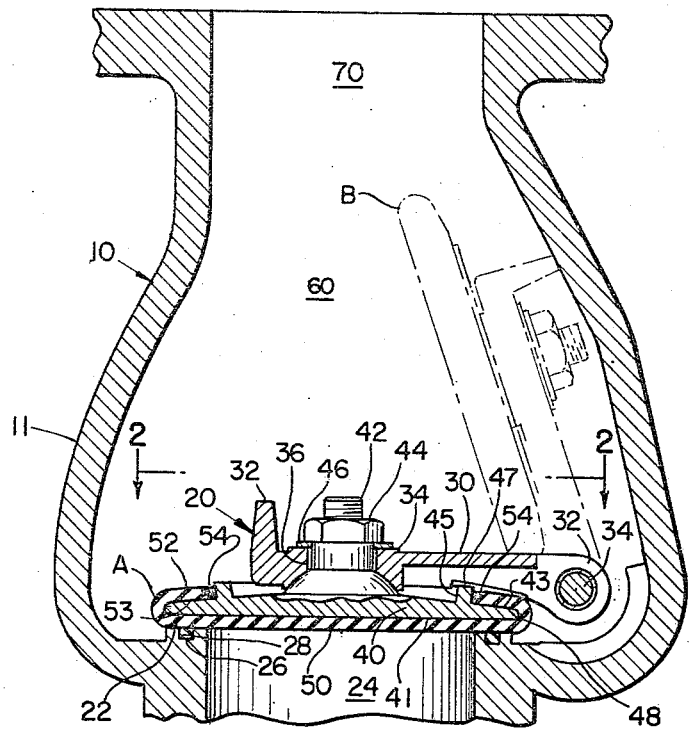
FIG. 1 is a sectioned side elevational view of a representative alarm check valve with the novel clapper construction.
Figure 2:
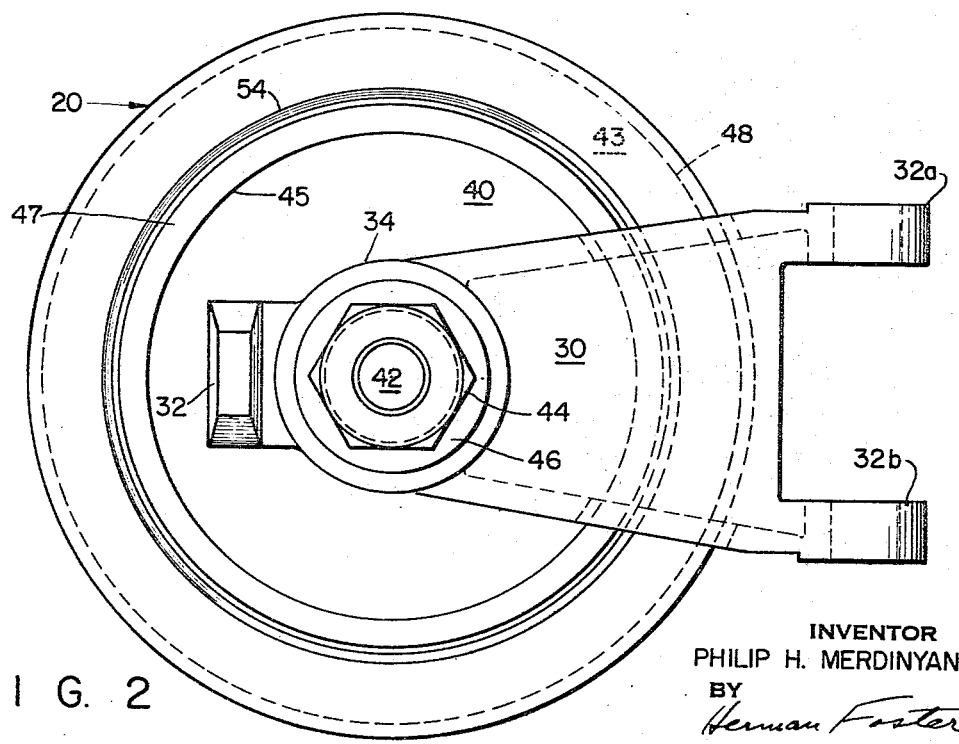
FIG. 2 is an enlarged top plan view of the clapper as viewed from line 2—2 of FIG. 1.

Referring in greater particularity to the drawing, the reference numeral 10 generally denotes an alarm check valve containing a clapper constructed in accordance with the present invention. The valve includes a casing 11 of metal. Within the casing is a clapper unit generally indicated by numeral 20. The particular valve illustrated here is shown for use in a vertical riser. Accordingly, the clapper unit 20 when in its closed position rests on a horizontal circular lip or seat 22 of an inlet portion 24 of the valve. Within a slot 26, about the center of the seat 22, is a ring shaped gasket 28. The same valve may be used in a horizontal riser.

The clapper unit 20 contains a clapper arm 30 having a bifurcated hinge portion 32a and b through which a pin 34 passes to join the clapper arm to the casing 11. The clapper unit is pivotable about the pin 34 to swing from a closed position A to an open position B which is indicated in dashed lines. The arm 30 has at its free swingable end, an abutment member 32 extending upwardly above the plane of the arm 30. When the clapper unit moves to its open position B this abutment member prevents other portions of the clapper unit from striking the valve casing. On the arm 30, adjacent the abutment member 32, is a boss 34 through which a hole 36 passes.

A clapper plate 40 is fastened beneath the arm 30 by means of a threaded stud 42 which extends through the hole 36. The fastening is accomplished by means of a nut 44 which is drawn down tightly on a flat washer 46 to firmly engage the boss. This is merely one form of joint construction between the clapper plate 40 and the clapper arm 30. If considered desirable the plate and arm can be made as an integral unit or more than one arm may connect the clapper and hinge.

As is illustrated, the clapper plate has a generally flat circular configuration with a peripheral rim 48. The bottom face 41 in particular is desirably flat. Extending across the entire bottom surface 41 in engagement therewith, and about the rim 48 of the clapper plate, is a removable diaphragm 50 preferably made of an elastomer such as rubber or a synthetic such as "Du Pont Ethylene Propylene Terpolymer." This diaphragm 50 has a circular upper lip 52 integral with the periphery of the diaphragm. The bottom surface 53 of the circular lip 52 firmly engages the upper peripheral margin of the clapper plate 40. This margin is indicated by the numeral 43. Since the margin is desirably slightly thicker than the distance between surface 53 and the flat portion 50 of the diaphragm a deformation of the diaphragm will occur which provides sufficient holding power for retaining the diaphragm in place. The inner circular edge of the circular lip 52 is beveled as indicated at 54. Defining the inner border of the margin 43 of the clapper plate is a ring shaped abutment 45 which is rectangular in cross-section. The upper face 47 of this abutment preferably extends above the upper surface of the lip 52.

The advantages of the clapper construction of this invention will be made apparent in connection with the following description of the operation of the valve.

In the casings of many alarm check valves, and including the present valve, are various openings leading to auxiliary equipment. Since these have little to do with the present invention, they are not shown nor will they be described.

The valve of FIG. 1 is illustrated in the closed position. Should the fire protection sprinkler system, of which this valve is part, be actuated, water will be transmitted to the inlet portion 24 of the valve. The flowing water will then push the clapper unit 20 into the open position indicated by B, at the same time filling the chamber 60 of the valve and continuing out of the outlet 70 of the valve and into the sprinkler system.

In the course of flowing through the valve the stream of water has been found to have extremely large tearing characteristics on obstructions in the path of flow of the water. Accordingly, it has been thought necessary that any member which would be subject to the force of the water stream be firmly fastened in place.

If such a member were left in place undisturbed for the life of the valve, the fastening requirement would not cause too great a burden on either the maker or user. But, as is the common case, sealing materials deteriorate with age and use. These materials, usually of some rubber-like material, have been made into valve seals in the form of gasket rings and/or discs to be fastened to the valve clapper. The removable fastenings have generally been either bolts or screws. However, these fastenings, when exposed to moist air and/or water for any length of time, have become difficult to remove because of the scale and/or corrosion or the like. As a result, the steps of changing the seals have been considered a burdensome and time consuming chore.

Because those skilled in the art recognized that the water rushing through the valve had great force, little was done in this art in the way of using a sealing member without a fastener of some kind. The present invention makes it possible to use a removable seal member such as a diaphragm without fastening members and without the risk of having the seal member torn loose by rushing water. Apparently, the deflection of part or all of the water about the clapper unit creates a vacuum or low pressure area in proximity to the downstream surface of the clapper member. In a construction such as the present invention it appears that such a vacuum would have a greater removing influence on a diaphragm such as 50 than a force imposed by direct impingement of the water.

Part of the success of the present invention is due to the use of the abutment ring 45. Apparently the ring, particularly with the upper surface 47 above the upper surface of the lip 52, breaks the vacuum which normally would occur at the edge 54 of the diaphragm if the ring abutment 45 were not present. Thus the inherent elasticity of the diaphragm, which is brought into play by the slight deformation of lip 52, is sufficient to hold the diaphragm in place. This is further illustrated by the fact that for valves having nominal clapper diameters of 4", 6" and 8" and a diaphragm thickness of 0.19"±.01, an overlap by the lip 52 over the margin 43 of approximately 0.6"±.1" is sufficient to retain the diaphragm in place.

As is shown in FIG. 1, it is not necessary for the edge 54 to contact the abutment ring 45. With the beveled edge 54 spaced as shown, this construction has effectively resisted the removal forces imposed by water flowing at 2400 gallons per minute through a 4" valve.

It is to be understood that the use of terms such as "upper" and "lower" or "inner" and "outer" in this specification and the following claims, are used merely as terms of reference between parts and are not intended to limit the orientation of this device thereby.

While a particular embodiment of the invention has been shown and described it is to be understood this is by way of illustration and not limitation, and that the limits are to be construed by the following claims.

I claim:

1. In a check valve having a casing with an inlet sealing seat, a clapper construction comprising:
 (A) a disc shaped clapper member containing two sides and a circular peripheral portion,
   (1) one of said sides having a substantially flat seating face for sealing said inlet, seat,
   (2) the other of said sides having raised means uniformly spaced inwardly from said peripheral portion of said clapper member defining a circular marginal portion between said peripheral and said raised means,
 (B) an elastomer diaphragm comprising a substantially flat imperforate portion covering said clapper flat seating face,
   (1) said diaphragm having a circular lip integral with the periphery of the substantially flat imperforate portion and spaced from said substantially flat imperforate portion a sufficient distance to snugly engage said marginal portion of said clapper member, and terminating in an interiorly oriented edge adjacent said raised means,
   (2) said diaphragm being mounted upon said clapper member with a slight deformation thereby being retained solely by the inherent elasticity of said diaphragm,
   (3) said raised means extending above said clapper means a distance greater than the thickness of said diaphragm,
 (C) means joined to said clapper member for hingedly connecting said clapper member to said casing.

2. In a check valve having a casing with an inlet sealing seat, a clapper construction comprising:
 (A) a disc shaped clapper member containing two sides and a circular peripheral portion,
   (1) one of said sides having a substantially flat seating face for sealing said inlet seat,
   (2) the other of said sides having a raised ring shaped portion uniformly spaced inwardly from said peripheral portion of said clapper member defining a circular marginal portion between said peripheral portion and said raised ring shaped portion,
 (B) an elastomer diaphragm comprising a substantially flat imperforate portion covering said clapper flat seating face,
   (1) said diaphragm having a circular lip integral with the periphery of the substantially flat imperforate portion and spaced from said substantially flat imperforate portion a sufficient distance to snugly engage said marginal portion of said clapper member,
     (a) said lip terminating in an interiorly oriented beveled edge lying adjacent said raised ring shaped portion,
     (b) said ring shaped portion extending above said clapper member a distance greater than the thickness of said diaphragm,
   (2) said diaphragm being mounted upon said clapper member with a slight deformation of said lip thereby being retained solely by the inherent elasticity of said diaphragm,
 (C) means joined to said clapper member for hingedly connecting said clapper member to said casing.

3. In a check valve having a casing with an inlet sealing seat, a clapper construction comprising:
 (A) a disc shaped clapper member having an upstream side and a downstream side joined by a circular peripheral portion,
   (1) said upstream side having a substantially flat seating face for sealingly engaging said inlet sealing seat,
   (2) said downstream side having raised means uniformly spaced inwardly from said peripheral portion of said clapper member defining a circular marginal portion between said peripheral portion and said raised means,
 (B) an elastomer diaphragm comprising a substantially flat imperforate portion covering said upstream side of said clapper member,
   (1) said diaphragm having a circular lip integral with the periphery of the substantially flat imperforate portion and spaced from said substantially flat imperforate portion a sufficient distance to snugly engage said marginal portion of said clapper member,
     (a) said lip terminating in a centrally oriented edge lying adjacent said raised means,
     (b) said raised means extending above said clapper member a distance greater than the thickness of said diaphragm,
   (2) said diaphragm being mounted upon said clapper member with a slight deformation of said lip, thereby being retained solely by the inherent elasticity of said diaphragm,
 (C) means joined to said clapper member for hingedly connecting said clapper member to said casing,
whereby, as water flows through said check valve, said raised means prevents the excess buildup of removal forces at said circular lip thus permitting said diaphragm to remain in place on said clapper member.

4. In a check valve having a casing with an inlet sealing seat, a clapper construction comprising:
 (A) a disc shaped clapper member having an upstream side and a downstream side joined by a circular peripheral portion,
   (1) said upstream side having a substantially flat seating face for sealingly engaging said inlet sealing seat.

(2) said downstream side having a raised ring shaped portion uniformly spaced inwardly from said peripheral portion of said clapper member thereby defining a circular marginal portion between said peripheral portion and said raised ring shaped portion, (B) an elastomer diaphragm comprising a substantially flat imperforate portion covering said upstream side of said clapper member, (1) said diaphragm having a circular lip integral with the periphery of the substantially flat imperforate portion a sufficient distance to snugly engage said marginal portion of said clapper member, (a) said lip terminating in a centrally oriented beveled edge lying adjacent said raised ring shaped portion, (2) said diaphragm being mounted upon said clapper member with a slight deformation of said lip, thereby being retained solely by the inherent elasticity of said diaphragm, (a) said raised ring portions extending above the outer surface of said lip, (C) means joined to said clapper member for hingedly connecting said clapper member to said casing, whereby as water flows through said check valve, said raised ring shaped portion prevents the excess buildup of removal forces at said circular lip thus permitting said diaphragm to remain in place on said clapper member.

5. A combination according to claim 4 wherein said bevel extends at an angle of 60° to the surface of said marginal portion and is spaced from said raised ring portion.

6. A combination according to claim 4 wherein said diaphragm and lip is approximately 0.19" thick, and said lip extends over said marginal portion approximately 0.6".

References Cited

UNITED STATES PATENTS

| | | | |
|---|---|---|---|
| 1,125,606 | 1/1915 | Tripp | 137—527.4 |
| 2,717,001 | 9/1955 | Perrault | 137—527.4 X |
| 2,920,861 | 1/1960 | Hartmann | 251—357 |
| 3,213,879 | 10/1965 | Thompson | 137—527.8 X |

FOREIGN PATENTS

| | | |
|---|---|---|
| 336,531 | 5/1921 | Germany. |
| 666,167 | 10/1938 | Germany. |

WILLIAM F. O'DEA, *Primary Examiner.*

D. J. ZOBKIW, *Examiner.*